US 12,064,993 B2

(12) United States Patent
Furukawa et al.

(10) Patent No.: US 12,064,993 B2
(45) Date of Patent: Aug. 20, 2024

(54) BEARING DEVICE FOR VEHICLE WHEEL

(71) Applicant: NTN Corporation, Osaka (JP)

(72) Inventors: Tasuku Furukawa, Iwata (JP); Shun Tamaki, Iwata (JP)

(73) Assignee: NTN CORPORATION, Osaka (JP)

( * ) Notice: Subject to any disclaimer, the term of this patent is extended or adjusted under 35 U.S.C. 154(b) by 420 days.

(21) Appl. No.: 17/618,738

(22) PCT Filed: Jun. 16, 2020

(86) PCT No.: PCT/JP2020/023532
§ 371 (c)(1),
(2) Date: Dec. 13, 2021

(87) PCT Pub. No.: WO2020/255945
PCT Pub. Date: Dec. 24, 2020

(65) Prior Publication Data
US 2022/0242167 A1    Aug. 4, 2022

(30) Foreign Application Priority Data

Jun. 19, 2019  (JP) .................................. 2019-113723

(51) Int. Cl.
*B60B 27/00* (2006.01)
*F16C 19/18* (2006.01)
*F16J 15/3232* (2016.01)

(52) U.S. Cl.
CPC ...... *B60B 27/0094* (2013.01); *B60B 27/0005* (2013.01); *F16C 19/183* (2013.01);
(Continued)

(58) Field of Classification Search
CPC ............. B60B 27/0073; B60B 27/0094; F16C 19/183; F16C 33/78; F16C 2326/02; F16J 15/3232; F16J 15/3256
See application file for complete search history.

(56) References Cited

U.S. PATENT DOCUMENTS

| 2006/0076737 A1* | 4/2006 | Kobayashi | G01P 3/443 |
| | | | 277/317 |
| 2009/0154855 A1* | 6/2009 | Kametaka | F16C 43/045 |
| | | | 384/485 |

(Continued)

FOREIGN PATENT DOCUMENTS

JP    11-304827    11/1999
JP    2006-118553    5/2006
(Continued)

OTHER PUBLICATIONS

International Search Report issued Aug. 18, 2020 in International (PCT) Application No. PCT/JP2020/023532.

*Primary Examiner* — S. Joseph Morano
*Assistant Examiner* — Emily G. Castonguay
(74) *Attorney, Agent, or Firm* — Wenderoth, Lind & Ponack, L.L.P.

(57) ABSTRACT

A bearing device for a wheel, which has improved axial assembly accuracy of a sealing member by reducing the amount of springback. The bearing device for a wheel comprises an inner sealing member that blocks an inner opening end of an annular space formed by an outer ring and an inner ring. A sealing ring of the inner sealing member has a core metal fitting in the outer ring and an elastic member joined to the core metal. The elastic member has: a pressing part that is pressed inward in the axial direction when the sealing ring is press-fitted into the outer ring; and a non-pressing part that is not pressed inward in the axial direction when the sealing ring is press-fitted into the outer ring, wherein the axial thickness of the pressing part is thinner than the axial thickness of the non-pressing part.

5 Claims, 10 Drawing Sheets

(52) U.S. Cl.
CPC ....... *F16J 15/3232* (2013.01); *B60B 2380/12* (2013.01); *B60B 2380/75* (2013.01); *F16C 2326/02* (2013.01)

(56) References Cited

U.S. PATENT DOCUMENTS

2018/0087575 A1\* 3/2018 Ohmori ................ F16J 15/3204
2018/0326782 A1\* 11/2018 Becker ................ B60B 27/0005

FOREIGN PATENT DOCUMENTS

| | | |
|---|---|---|
| JP | 2008-045673 | 2/2008 |
| JP | 2008-064195 | 3/2008 |
| JP | 2017-067245 | 4/2017 |

\* cited by examiner

BEARING DEVICE FOR VEHICLE WHEEL

TECHNICAL FIELD

The present invention relates to a bearing device for a vehicle wheel.

BACKGROUND ART

In a bearing device for a vehicle wheel, a sealing member for preventing entry of foreign matter such as muddy water is provided between an outer member and an inner member (see, e.g., Patent Literature 1). The sealing member of Patent Literature 1 includes a slinger externally fitted to the inner member and a sealing ring internally fitted to the outer member. The sealing ring includes a core metal and an elastic member joined to the core metal.

The sealing ring is press-fitted into the outer member by being pressed against the outer member inward in an axial direction by a press-fitting jig. At this time, the elastic member is disposed in a portion of the sealing ring pressed by the press-fitting jig. Therefore, even when the sealing ring is pushed to a specified position by the press-fitting jig, the elastic member pressed by the press-fitting jig is elastically restored. As a result, so-called springback occurs in which the sealing ring is located to be shifted outward in the axial direction from the specified position. Therefore, axial assembly accuracy of the sealing member is deteriorated.

CITATION LIST

Patent Literature

Patent Literature 1: JP-A 2006-118553 Gazette

SUMMARY OF THE INVENTION

Technical Problems

The present invention has been made in view of the above circumstances, and an object of the present invention is to provide a bearing device for a vehicle wheel in which axial assembly accuracy of a sealing member is improved by reducing an amount of springback.

Solutions to Problems

A first aspect of the present invention provides a bearing device for a vehicle wheel, including: an outer member having a plurality of rows of outer raceway surfaces at an inner periphery; an inner member that includes a hub ring having a small diameter step part extending in an axial direction at an outer periphery and at least one inner ring press-fitted into the small diameter step part of the hub ring, and that has, at the outer periphery, a plurality of rows of inner raceway surfaces facing the plurality of rows of outer raceway surfaces; a plurality of rows of rolling elements rollably housed between the respective raceway surfaces of the inner member and the outer member; and a sealing member that blocks an opening end of an annular space formed by the outer member and the inner member, in which the sealing member has a core metal fitted to the outer member and an elastic member joined to the core metal, the elastic member has a pressing part joined to a first joint surface, which is a part of an axially outer surface of the core metal, and pressed inward in the axial direction when the sealing member is press-fitted into the outer member, and a non-pressing part joined to a second joint surface, which is a part of the axially outer surface of the core metal and adjacent to the first joint surface, and not pressed inward in the axial direction when the sealing member is press-fitted into the outer member, and an axial thickness of the pressing part is thinner than an axial thickness of the non-pressing part.

Advantageous Effects of Invention

According to the present invention, axial assembly accuracy of the sealing member can be improved by reducing an amount of springback in the sealing member of the bearing device for a vehicle wheel.

DESCRIPTION OF EMBODIMENTS

[Overall Configuration of Bearing Device for Vehicle Wheel]

An overall configuration of a bearing device for a vehicle wheel 1 will be described with reference to FIG. 1. Note that in the following description, the inner side represents a vehicle body side of the bearing device for a vehicle wheel 1 when attached to the vehicle body, and the outer side represents a vehicle wheel side of the bearing device for a vehicle wheel 1 when attached to the vehicle body.

Figure 1:
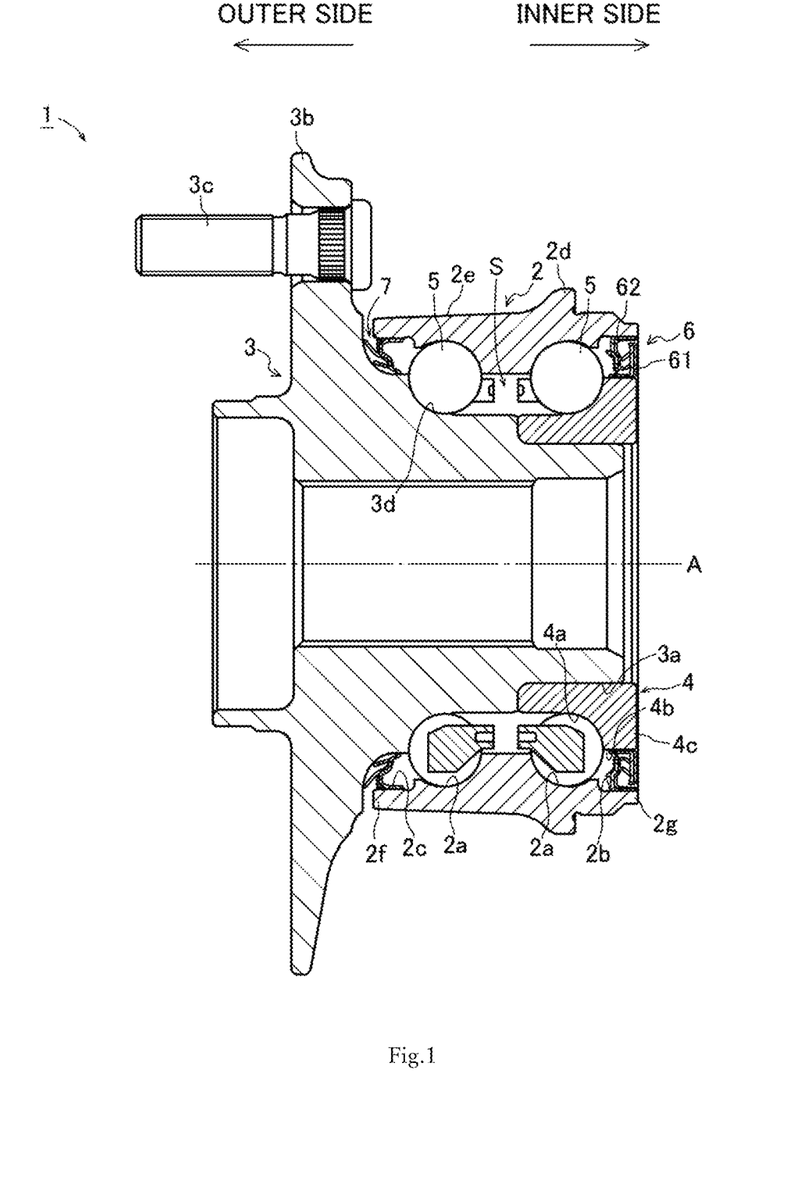
FIG. 1 is a cross-sectional view of a bearing device for a vehicle wheel according to an embodiment.

As illustrated in FIG. 1, the bearing device for a vehicle wheel 1 rotatably supports a vehicle wheel in a suspension device of a vehicle such as an automobile. The bearing device for a vehicle wheel 1 includes an outer ring 2, a hub ring 3, an inner ring 4, rolling elements 5, an inner sealing member 6, and an outer sealing member 7.

The outer ring 2, which is an outer member, supports the hub ring 3 and the inner ring 4. An inner fitting surface 2b to which a sealing ring 62 is fitted is provided on an inner peripheral surface at an inner end portion 2g of the outer ring 2. An outer fitting surface 2c to which the outer sealing member 7 is fitted is provided at an outer end portion 2f of the outer ring 2. A vehicle body mounting flange 2d for mounting to a knuckle of the suspension device (not illustrated) is integrally provided on an outer peripheral surface 2e of the outer ring 2. A plurality of rows of outer raceway surfaces 2a, 2a are provided in a circumferential direction on the inner side and the outer side of an inner peripheral surface of the outer ring 2.

An inner member includes the hub ring 3 and the inner ring 4. The hub ring 3 rotatably supports a vehicle wheel of the vehicle (not illustrated). A small diameter step part 3a whose diameter is reduced is provided at an inner end portion of an outer peripheral surface of the hub ring 3. A vehicle wheel mounting flange 3b for mounting a vehicle wheel is integrally provided at an outer end portion of the hub ring 3. A hub bolt 3c for fastening the hub ring 3 and the vehicle wheel or a brake device is press-fitted into the vehicle wheel mounting flange 3b. In addition, an inner raceway surface 3d is provided on an outer peripheral surface on the outer side of the hub ring 3.

The inner ring 4 is press-fitted into the small diameter step part 3a of the hub ring 3. An inner raceway surface 4a is provided on an outer peripheral surface of the inner ring 4. That is, the inner ring 4 forms the inner raceway surface 4a on the inner side of the hub ring 3. In addition, a fitting surface 4b to which a slinger 61 of the inner sealing member 6 is fitted is provided on the outer peripheral surface at an inner end portion 4c of the inner ring 4.

The inner sealing member 6 and the outer sealing member 7 are sealing members that block opening ends of an annular space S formed by the outer member and the inner member. The inner sealing member 6 is attached to an inner opening end of the annular space S that is formed between the outer ring 2 and the inner ring 4. On the other hand, the outer sealing member 7 is attached to an outer opening end of the annular space S that is formed between the outer ring 2 and the hub ring 3. Hereinafter, detailed configurations of the inner sealing member 6 and the outer sealing member 7 will be described.

[Inner Sealing Member]

The configuration of the inner sealing member 6 will be described with reference to FIGS. 2 to 4. The cross section of the inner sealing member 6 in FIG. 3 shows a cross section at a position III-III in FIG. 2, and the cross section of the inner sealing member 6 in FIG. 4 shows a cross section at a position IV-IV in FIG. 2.

In the following description, the outward in a radial direction represents a direction away from a rotation axis A (see FIG. 1) of the hub ring 3, and the inward in the radial direction represents a direction approaching the rotation axis A of the hub ring 3 (see FIG. 3). The axial direction represents a direction parallel to the rotation axis A. In addition, the outward in the axial direction represents a direction away from the annular space S along the rotation axis A, and the inward in the axial direction represents a direction approaching the annular space S along the rotation axis A (see FIG. 3). In the inner sealing member 6, the outward in the axial direction is the inner side, and the inward in the axial direction is the outer side. In the outer sealing member 7, the outward in the axial direction is the outer side, and the inward in the axial direction is the inner side.

Figure 3:
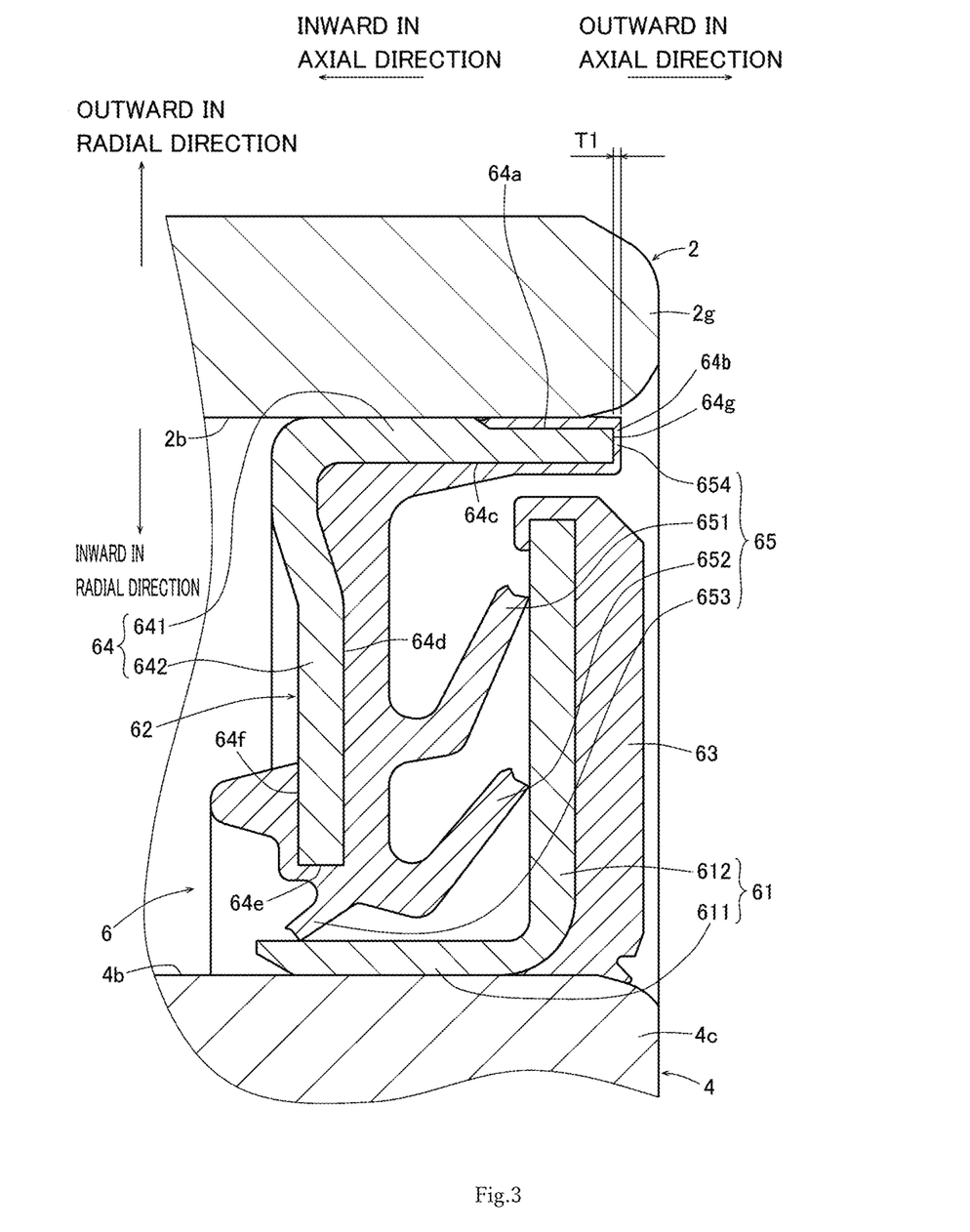
FIG. 3 is a cross-sectional view of a periphery of the inner sealing member.
Figure 4:
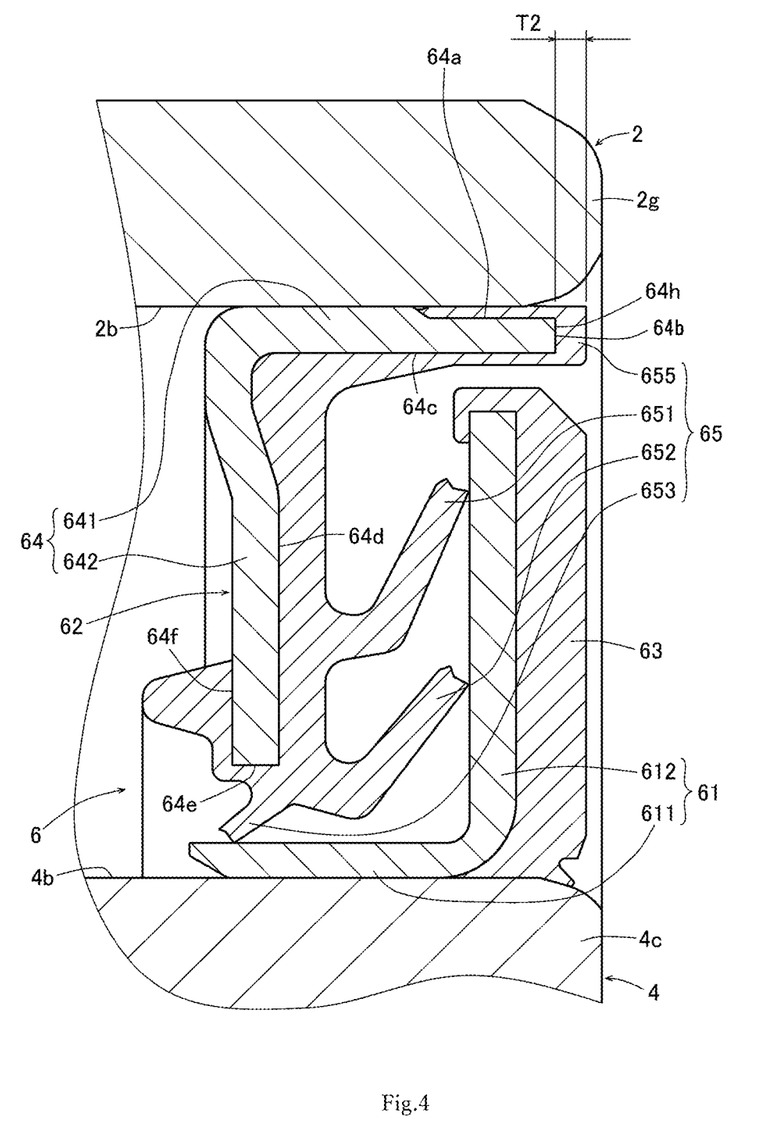
FIG. 4 is a cross-sectional view of a periphery of the inner sealing member.

As illustrated in FIG. 3, the inner sealing member 6 has the slinger 61 and the sealing ring 62. The slinger 61 is a torus made of, for example, a steel plate, and has an outer fitting part 611 and an outer plate part 612. The outer fitting part 611 is a cylindrical portion externally fitted to the fitting surface 4b of the inner ring 4. The outer plate part 612 is a donut plate-shaped portion extending outward in the radial direction from an axially outer end portion of the outer fitting part 611. In addition, an encoder 63 is provided on an axially outer surface of the outer plate part 612 of the slinger 61. The encoder 63 is made of synthetic rubber or the like in which magnetic poles (N pole and S pole) are arranged, and is joined to the slinger 61 by vulcanization bonding or the like.

The sealing ring 62 has a core metal 64 and an elastic member 65. The core metal 64 is a torus made of, for example, a steel plate, and has an inner fitting part 641 and an inner plate part 642. The inner fitting part 641 is a cylindrical portion internally fitted to the inner fitting surface 2b of the outer ring 2. The inner plate part 642 is a donut plate-shaped portion extending inward in the radial direction from an axially inner end portion of the inner fitting part 641.

The elastic member 65 is made of, for example, synthetic rubber, and is joined to the core metal 64 by vulcanization bonding or the like. The elastic member 65 covers from an outer peripheral surface 64a near the tip portion of the inner fitting part 641 of the core metal 64 to an axially outer surface 64d and a tip surface 64e of the inner plate part 642 and an axially inner surface 64f near the tip portion through a tip surface 64b and an inner peripheral surface 64c.

The elastic member 65 has two side lips 651 and 652, one grease lip 653, a pressing part 654, and a non-pressing part 655. The tip portions of the side lips 651 and 652 are in contact with the outer plate part 612 of the slinger 61. The tip portion of the grease lip 653 is in contact with or close to the outer fitting part 611 of the slinger 61. The grease lip 653 prevents the grease inside the bearing device for a vehicle wheel 1 from leaking to the outside.

Figure 2:
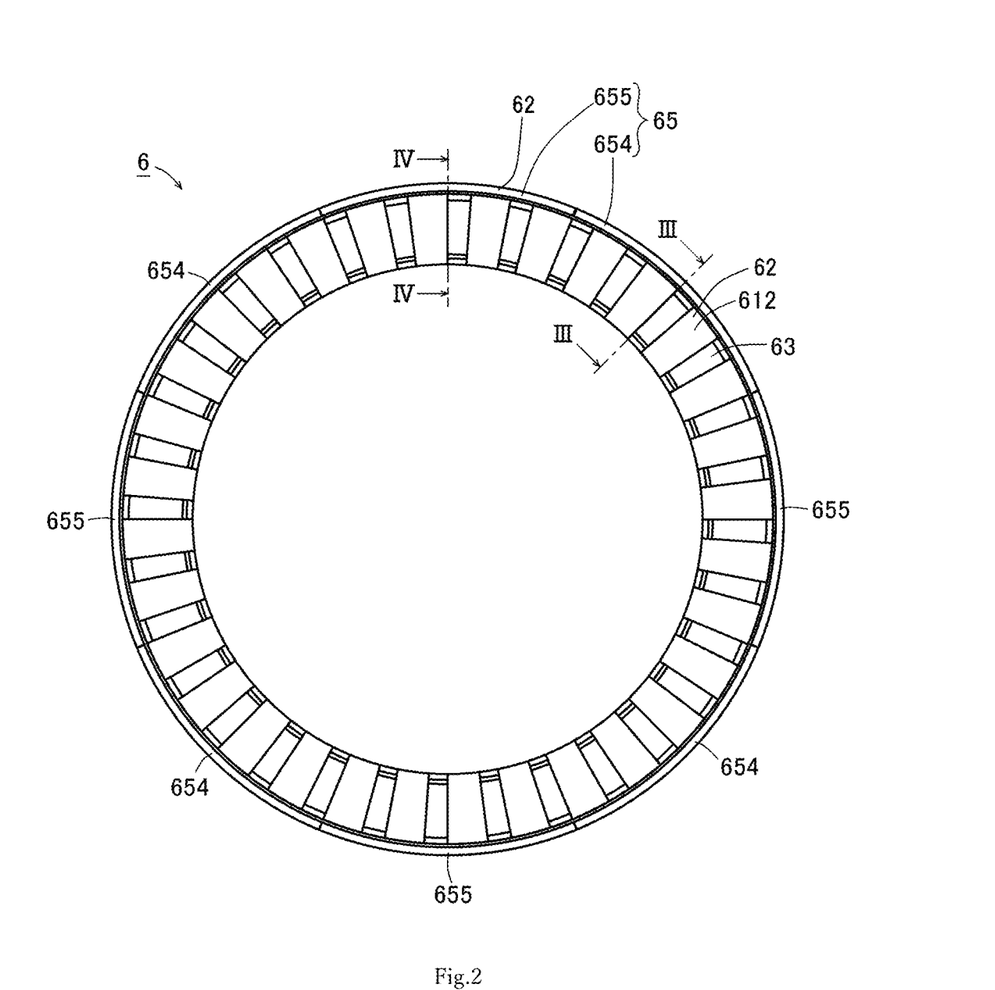
FIG. 2 is a view illustrating an inner sealing member as viewed from an inner side.

As illustrated in FIG. 2, the pressing part 654 and the non-pressing part 655 are portions joined to the tip surface 64b of the inner fitting part 641 of the core metal 64. In FIG. 2, four pressing parts 654 and four non-pressing parts 655, having the same circumferential length, are alternately disposed along the circumferential direction. Note that the lengths and the numbers of the pressing parts 654 and the non-pressing parts 655 are not particularly limited as long as the pressing parts 654 and the non-pressing parts 655 are alternately disposed along the circumferential direction.

The pressing part 654 is a portion that is pressed inward in the axial direction by a press-fitting jig when the sealing ring 62 is press-fitted into the inner fitting surface 2b of the outer ring 2. On the other hand, the non-pressing part 655 is a portion that is not pressed by the press-fitting jig.

Assuming that a portion of the tip surface 64b to which the pressing part 654 is joined is a first joint surface 64g (see FIG. 3) and a portion of the tip surface 64b to which the non-pressing part 655 is joined is a second joint surface 64h (see FIG. 4), the first joint surface 64g and the second joint surface 64h are flush with each other. And, an axial thickness T1 (see FIG. 3) of the pressing part 654 is thinner than an axial thickness T2 (see FIG. 4) of the non-pressing part 655. That is, the non-pressing part 655 protrudes more outward in the axial direction than the pressing part 654. In other words, the non-pressing part 655 is a convex portion and the pressing part 654 is a concave portion in the axial direction. The thickness T1 of the pressing part 654 is preferably as thin as possible within a range in which strength can be maintained from the viewpoint of an amount of springback that will be described later.

In the step of assembling the bearing device for a vehicle wheel 1, the inner sealing member 6 is assembled after the outer ring 2, the hub ring 3, the inner ring 4, and the rolling elements 5 are assembled. The inner sealing member 6 is press-fitted into the inner opening end of the annular space S using a press-fitting jig in a state where the slinger 61 and the sealing ring 62 are combined. The press-fitting jig simultaneously pushes, to a specified position, the pressing part 654 of the elastic member 65 in the sealing ring 62 and a portion of the outer plate part 612 in the slinger 61 where the encoder 63 is not provided.

The pressing part 654 is compressed by elastic deformation while being pressed by the press-fitting jig. When the press-fitting jig is then separated, the pressing part 654 is elastically restored and extends outward in the axial direction to the original thickness. As a result, so-called springback occurs in which the sealing ring 62 is located to be shifted outward in the axial direction from the specified position.

However, in the bearing device for a vehicle wheel 1 according to the present embodiment, the axial thickness T1 of the pressing part 654 is thinner than the axial thickness T2 of the non-pressing part 655. Therefore, by the press-fitting jig pressing the pressing part 654 as described above, the amount of springback can be made smaller than the case of pressing the non-pressing part 655. Therefore, axial assembly accuracy of the sealing ring 62 can be improved. As a result, variations in the performances of the inner sealing member 6, such as bearing rotational torque and sealability, are reduced.

Figure 5:
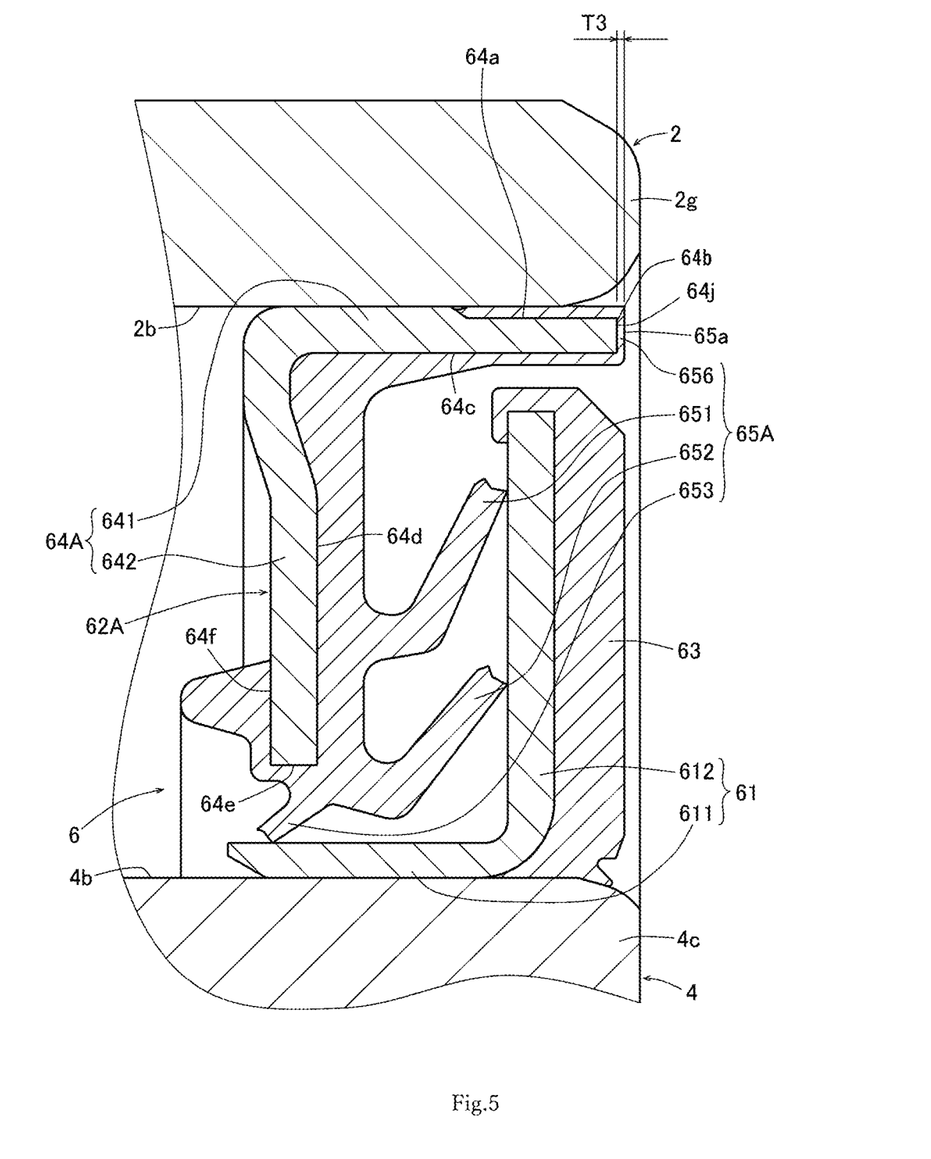
FIG. 5 is a cross-sectional view of a periphery of an inner sealing member according to another embodiment.
Figure 6:
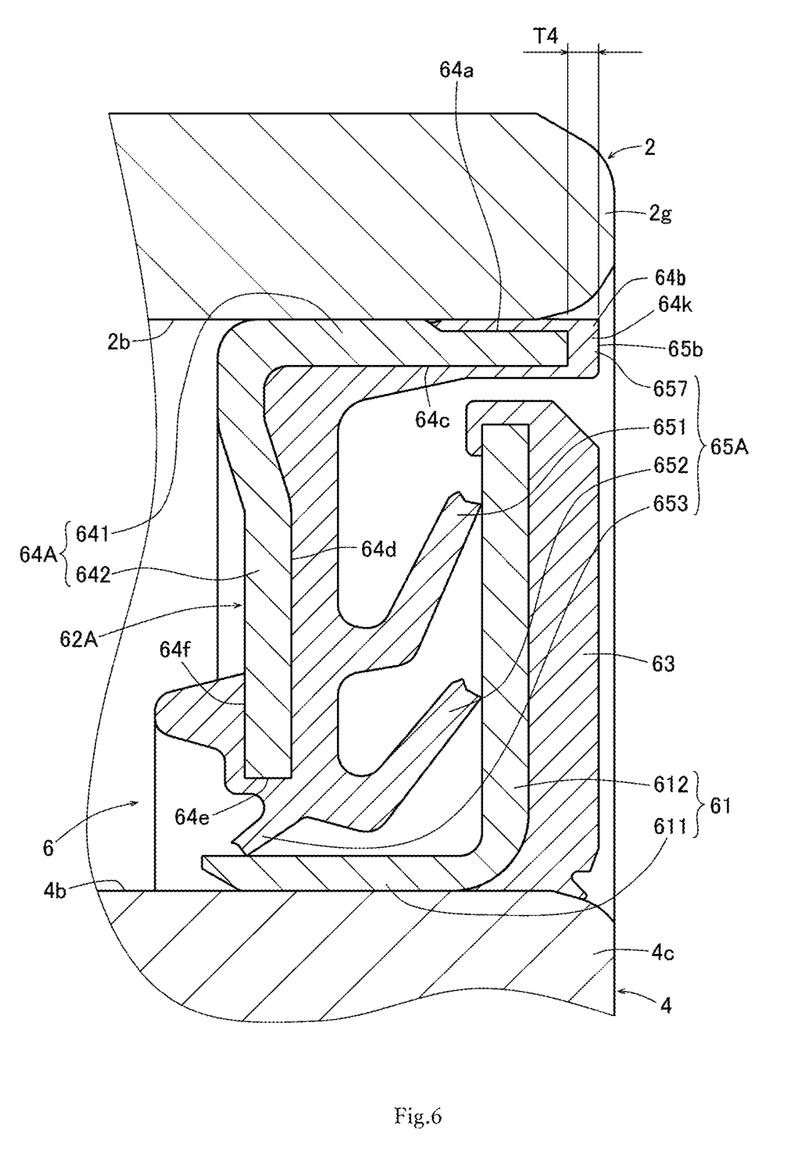
FIG. 6 is a cross-sectional view of a periphery of the inner sealing member according to another embodiment.

Next, a configuration of a sealing ring 62A according to another embodiment will be described with reference to FIGS. 5 and 6. The positions of the cross sections of the inner sealing member 6 in FIGS. 5 and 6 are the same as the position and the position IV-IV in FIG. 2, respectively. In the following description, the same members and portions as those of the bearing device for a vehicle wheel 1 will be denoted by the same reference signs, and detailed description thereof will be omitted.

The sealing ring 62A has a core metal 64A and an elastic member 65A. The core metal 64A is different from the core metal 64 in that a first joint surface 64j (see FIG. 5) is located more outward in the axial direction than a second joint surface 64k (see FIG. 6). In other words, the first joint surface 64j portion is a convex portion and the second joint surface 64k portion is a concave portion in the axial direction.

The elastic member 65A is different from the elastic member 65 in that an axially outer surface 65a (see FIG. 5) of a pressing part 656 and an axially outer surface 65b (see FIG. 6) of a non-pressing part 657 are flush with each other. That is, an axial thickness T3 (see FIG. 5) of the pressing part 656 is thinner than an axial thickness T4 (see FIG. 6) of the non-pressing part 657. The same effects as those described above can also be obtained by such a sealing ring 62A.

[Outer Sealing Member]

Figure 7:
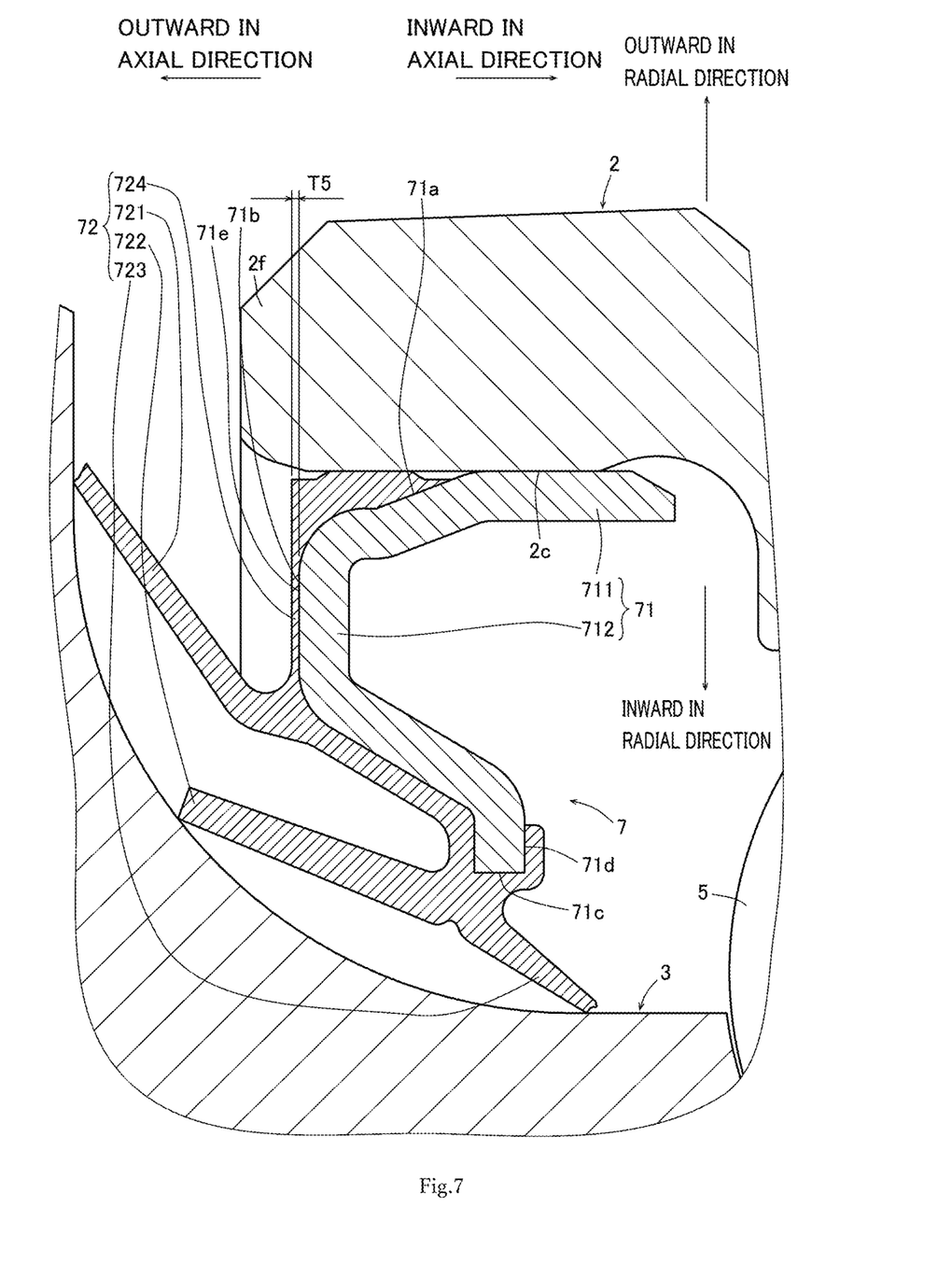
FIG. 7 is a cross-sectional view of a periphery of an outer sealing member.
Figure 8:
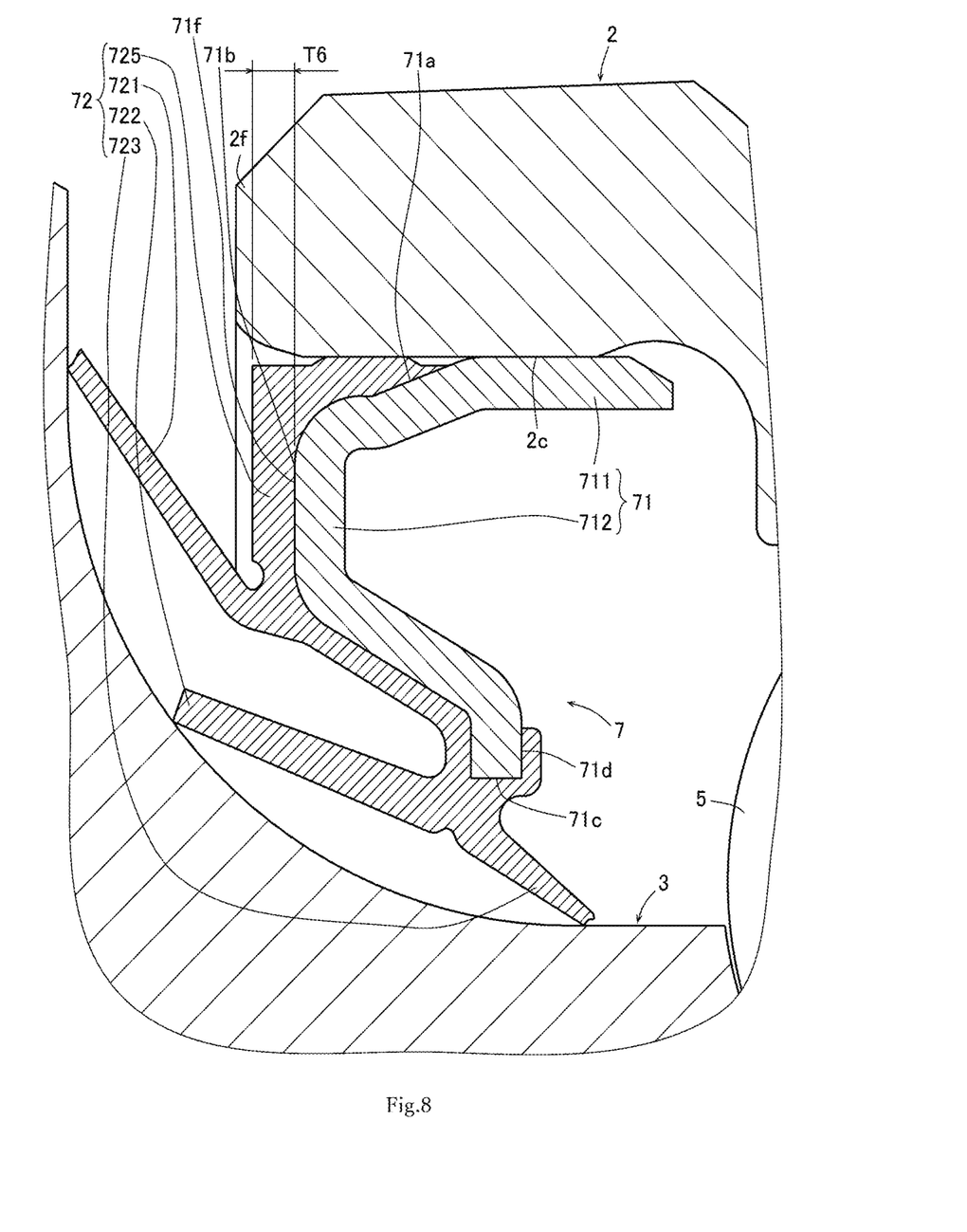
FIG. 8 is a cross-sectional view of a periphery of the outer sealing member.

A configuration of the outer sealing member 7 will be described with reference to FIGS. 7 and 8. FIG. 7 illustrates a cross section of a pressing part 724 of an elastic member 72 of the outer sealing member 7, and FIG. 8 illustrates a cross section of a non-pressing part 725 of the elastic member 72 of the outer sealing member 7.

As illustrated in FIG. 7, the outer sealing member 7 has a core metal 71 and the elastic member 72. The core metal 71 is a torus made of, for example, a steel plate, and has an inner fitting part 711 and an outer plate part 712. The inner fitting part 711 is a cylindrical portion internally fitted to the outer fitting surface 2c of the outer ring 2. The outer plate part 712 is a portion extending inward in the radial direction from an axially outer end portion of the inner fitting part 711.

The elastic member 72 is made of, for example, synthetic rubber, and is joined to the core metal 71 by vulcanization bonding or the like. The elastic member 72 covers from an outer peripheral surface 71a near the tip portion of the inner fitting part 711 of the core metal 71 to a tip surface 71c and an axially inner surface 71d near the tip portion through an axially outer surface 71b of the outer plate part 712.

The elastic member 72 has a side lip 721, an intermediate lip 722, a grease lip 723, a pressing part 724, and a non-pressing part 725. The tip portion of the side lip 721 and the tip portion of the intermediate lip 722 are in contact with the hub ring 3. The tip portion of the grease lip 723 is in contact with or close to the hub ring 3. The grease lip 723 prevents the grease inside the bearing device for a vehicle wheel 1 from leaking to the outside.

As illustrated in FIGS. 7 and 8, the pressing part 724 and the non-pressing part 725 are portions joined to the axially outer surface 71b of the outer plate part 712 of the core metal 71. In the present embodiment, four pressing parts 724 and four non-pressing parts 725, having the same circumferential length, are alternately disposed along the circumferential direction, similarly to the embodiment of FIG. 2. Note that the lengths and the numbers of the pressing parts 724 and the non-pressing parts 725 are not particularly limited as long as the pressing parts 724 and the non-pressing parts 725 are alternately disposed along the circumferential direction.

The pressing part 724 is a portion that is pressed inward in the axial direction by a press-fitting jig when the outer sealing member 7 is press-fitted into the outer fitting surface 2c of the outer ring 2. On the other hand, the non-pressing part 725 is a portion that is not pressed by the press-fitting jig.

Assuming that a portion of the axially outer surface 71b to which the pressing part 724 is joined is a first joint surface 71e (see FIG. 7) and a portion of the axially outer surface 71b to which the non-pressing part 725 is joined is a second joint surface 71f (see FIG. 8), the first joint surface 71e and the second joint surface 71f are flush with each other. And, an axial thickness T5 (see FIG. 7) of the pressing part 724 is thinner than an axial thickness T6 (see FIG. 8) of the non-pressing part 725. That is, the non-pressing part 725 protrudes more outward in the axial direction than the pressing part 724. In other words, the non-pressing part 725 is a convex portion and the pressing part 724 is a concave portion in the axial direction. The thickness T5 of the pressing part 724 is preferably as thin as possible within a range in which strength can be maintained from the viewpoint of an amount of springback.

In the step of assembling the bearing device for a vehicle wheel 1, the outer sealing member 7 is assembled to the outer ring 2 before the hub ring 3 is assembled. The outer sealing member 7 is press-fitted into an outer opening end of the annular space S using a press-fitting jig. The press-fitting jig pushes the pressing part 724 of the outer sealing member 7 to a prescribed position. Therefore, the amount of springback can be reduced, similarly to the case of the above sealing ring 62, whereby axial assembly accuracy of the outer sealing member 7 can be improved. As a result, a variation in the performance of the outer sealing member 7 is reduced.

Figure 9:
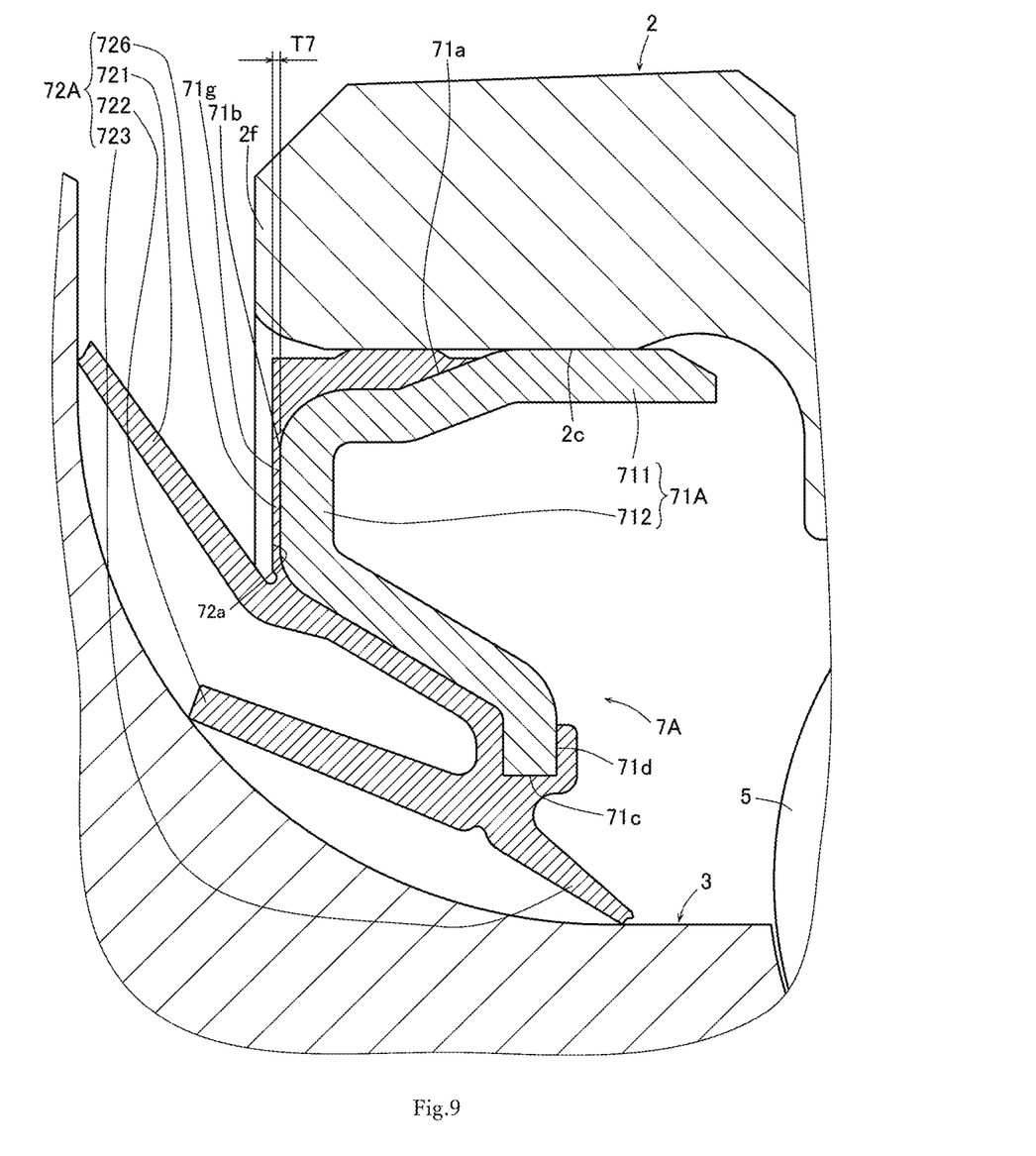
FIG. 9 is a cross-sectional view of a periphery of an outer sealing member according to another embodiment.
Figure 10:
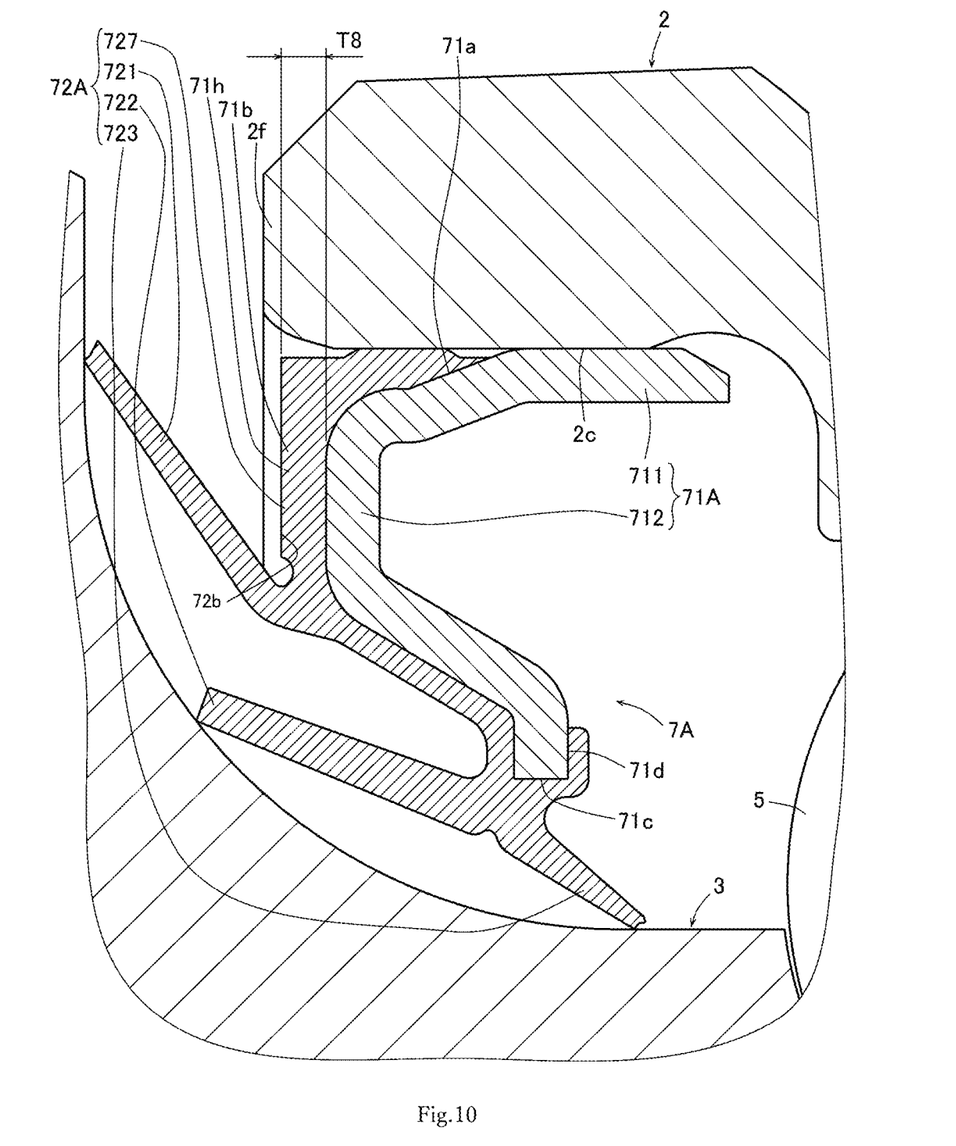
FIG. 10 is a cross-sectional view of a periphery of the outer sealing member according to another embodiment.

Next, a configuration of an outer sealing member 7A according to another embodiment will be described with reference to FIGS. 9 and 10. The positions of the cross sections of the outer sealing member 7A in FIGS. 9 and 10 are the same as the positions in FIGS. 8 and 9, respectively.

The outer sealing member 7A has a core metal 71A and an elastic member 72A. The core metal 71A is different from the core metal 71 in that a first joint surface 71g (see FIG. 9) is located more outside in the axial direction than a second joint surface 71h (see FIG. 10). In other words, the first joint surface 71g portion is a convex portion and the second joint surface 71h portion is a concave portion in the axial direction.

The elastic member 72A is different from the elastic member 72 in that an axially outer surface 72a (see FIG. 9) of a pressing part 726 and an axially outer surface 72b (see FIG. 10) of a non-pressing part 727 are flush with each other. That is, an axial thickness T7 (see FIG. 9) of the pressing part 726 is thinner than an axial thickness T8 (see FIG. 10) of the non-pressing part 727. The same effects as those described above can also be obtained by such an outer sealing member 7A.

As described above, the bearing device for a vehicle wheel 1 according to the present embodiment has been described as a bearing device for a vehicle wheel having a third-generation structure in which the inner raceway surfaces 3d of the rolling elements 5 are directly formed at the outer periphery of the hub ring 3. However, the present invention is not limited to this. For example, the bearing device for a vehicle wheel 1 may have, for example, a second-generation structure of inner ring rotation in which a pair of the inner rings 4 are press-fitted and fixed to the hub ring 3. In addition, the above embodiments merely show representative embodiments of the present invention, and various modifications can be made without departing from the gist of the present invention.

INDUSTRIAL APPLICABILITY

The present invention can be used in a bearing device for a vehicle wheel.

REFERENCE SIGNS LIST 1 bearing device for vehicle wheel
2 outer ring (outer member)
2a outer raceway surface
3 hub ring (inner member)
3a small diameter step part
4 inner ring (inner member)
4a, 3d inner raceway surface
5 rolling element
6 inner sealing member (sealing member)
7, 7A outer sealing member (sealing member)
64, 64A, 71, 71A core metal
64g, 64j, 71e, 71g first joint surface
64h, 64k, 71f, 71h second joint surface
65, 65A, 72, 72A elastic member
654, 656, 724, 726 pressing part
655, 657, 725, 727 non-pressing part
S annular space
T1, T3, T5, T7 axial thickness of pressing part
T2, T4, T6, T8 axial thickness of non-pressing part

The invention claimed is:

1. A bearing device for a vehicle wheel, comprising:
an outer member having a plurality of rows of outer raceway surfaces at an inner periphery;
an inner member that includes a hub ring having a small diameter step part extending in an axial direction at an outer periphery and at least one inner ring press-fitted into the small diameter step part of the hub ring, and that has, at the outer periphery, a plurality of rows of inner raceway surfaces facing the plurality of rows of outer raceway surfaces;
a plurality of rows of rolling elements rollably housed between the respective raceway surfaces of the inner member and the outer member; and
a sealing member that blocks an opening end of an annular space formed by the outer member and the inner member,
wherein the sealing member has a core metal fitted to the outer member and an elastic member joined to the core metal,
the elastic member has
a pressing part joined to a first joint surface, which is a part of an axially outer surface of the core metal, and pressed inward in the axial direction when the sealing member is press-fitted into the outer member, and
a non-pressing part joined to a second joint surface, which is a part of the axially outer surface of the core metal and adjacent to the first joint surface, and not pressed inward in the axial direction when the sealing member is press-fitted into the outer member, and
an axial thickness of the pressing part is thinner than an axial thickness of the non-pressing part.

2. The bearing device for a vehicle wheel according to claim 1, wherein
the first joint surface and the second joint surface are flush with each other, and
the non-pressing part protrudes more outward in the axial direction than the pressing part.

3. The bearing device for a vehicle wheel according to claim 1, wherein
the first joint surface is located more outward in the axial direction than the second joint surface, and
an axially outer surface of the pressing part and an axially outer surface of the non-pressing part are flush with each other.

4. The bearing device for a vehicle wheel according to claim 1, wherein the sealing member is an inner sealing member that blocks an inner opening end of an annular space formed by the outer member and the inner member.

5. The bearing device for a vehicle wheel according to claim 1, wherein the sealing member is an outer sealing member that blocks an outer opening end of the annular space formed by the outer member and the inner member.

* * * * *